(12) United States Patent
Chang

(10) Patent No.: US 8,391,372 B2
(45) Date of Patent: Mar. 5, 2013

(54) METHOD OF DOUBLING FRAME RATE OF VIDEO SIGNALS

(75) Inventor: Fang Chen Chang, Tainan County (TW)

(73) Assignee: Himax Technologies Limited, Tainan County (TW)

( * ) Notice: Subject to any disclaimer, the term of this patent is extended or adjusted under 35 U.S.C. 154(b) by 1287 days.

(21) Appl. No.: 11/749,374

(22) Filed: May 16, 2007

(65) Prior Publication Data

US 2008/0279278 A1    Nov. 13, 2008

(30) Foreign Application Priority Data

May 9, 2007 (TW) .............................. 96116365 A

(51) Int. Cl.
*H04N 11/04* (2006.01)

(52) U.S. Cl. .................................. 375/240.26

(58) Field of Classification Search .............. 375/240.26
See application file for complete search history.

(56) References Cited

U.S. PATENT DOCUMENTS

| | | | |
|---|---|---|---|
| 2004/0264576 A1* | 12/2004 | Woods et al. | 375/240.24 |
| 2008/0204592 A1* | 8/2008 | Jia et al. | 348/402.1 |

\* cited by examiner

*Primary Examiner* — Aravind Moorthy

(74) *Attorney, Agent, or Firm* — WPAT, P.C.; Anthony King

(57) ABSTRACT

A method for doubling the frame rate of video signals creates an interpolated video frame using a current frame and a previous frame. First, the current frame is sequentially received. The interpolated frame is inserted between a previous frame and the current frame, in which values for each pixel in the interpolated frame are derived from a first reference pixel in the current frame biased by a positively weighted difference between the first reference pixel and a second reference pixel in the previous frame.

6 Claims, 4 Drawing Sheets

METHOD OF DOUBLING FRAME RATE OF VIDEO SIGNALS

BACKGROUND OF THE INVENTION

1. Field of the Invention

The present invention relates to a method of doubling the frame rate of video signals, and more particularly relates to a method for frame rate up conversion.

2. Description of the Related Art

To display the full frame rate at the receiver side, a recovery mechanism, called frame rate up conversion (FRUC), is needed to re-generate the skipped frames and to reduce temporal artifacts. Generally, FRUC is the process of video interpolation at the video decoder to increase the perceived frame rate of the reconstructed video.

In FRUC, interpolated frames are created using received frames as references. Currently, systems implementing FRUC frame interpolation include approaches based on motion compensated interpolation and the processing of transmitted motion vectors. FRUC is also used in converting between various video formats.

Many FRUC algorithms have been proposed, which can be classified into two categories. The first category interpolates the missing frame by using a combination of received video frames without taking object motion into account. Frame repetition and frame averaging methods fit into this class. FIG. 1(a) shows the value of each pixel in an interpolated frame determined by a frame repetition method. The value of each interpolated pixel in an interpolated frame at time $T_n$ is the same as the value of each corresponding current reference pixel in a current frame at time $T_{n+1}$ rather than a previous frame at time $T_{n-1}$. Furthermore, FIG. 1(b) shows the value of each pixel in an interpolated frame determined by a frame averaging method. The value of each interpolated pixel in an interpolated frame at time $T_n$ is an average between that of each corresponding current reference pixel in a current frame at time $T_{n+1}$ and that of each corresponding previous reference pixel in a previous frame at time $T_{n-1}$. The drawbacks of these methods include the production of motion jerkiness, "ghost" images and blurring of moving objects when there is motion involved.

The second category is more advanced compared to the first category, and utilizes the transmitted motion information, the so-called motion compensated (frame) interpolation (MCI). Although MCI offers some advantages, it also introduces unwanted areas such as overlapped (multiple motion trajectories pass through this area) and hole (no motion trajectory passes through this area) regions in interpolated frames. The interpolation of overlapped and hole regions are a major technical challenge in conventional motion compensated approaches. On the other hand, the drawbacks of methods related to MCI include an increase in the complexity of interpolation operations.

Accordingly, there is a need to overcome the issues noted above. That is, an uncomplicated and high visual quality method for frame rate up conversion is urgently needed in various video applications.

SUMMARY OF THE INVENTION

An objective of the present invention is to provide a method of doubling the frame rate of video signals. The method uses a current frame and a previous frame to create an interpolated frame, and the value of each pixel in the interpolated frame is likely to be overshot or undershot in comparison with the value of the reference pixel in the current frame so that motion blurring and flicker are reduced in the interpolated frame.

Another objective of the present invention is to provide an uncomplicated method for doubling the frame rate of video signals. The computational method is dependent on the value of each corresponding reference pixel in a current frame and the value of each corresponding reference pixel in a previous frame so that such a doubling frame rate method is uncomplicated and easily implemented.

In order to achieve the objective, the present invention discloses a method for doubling the frame rate of video signals having a succession of frames. First, a current frame is sequentially received. An interpolated frame is inserted between a previous frame and the current frame, in which values for each pixel in the interpolated frame are derived from a first reference pixel in the current frame biased by a positively weighted difference between the first reference pixel and a second reference pixel in the previous frame.

The positively weighted difference is the first reference pixel subtracted by the second reference pixel and multiplied by a positive weight.

BRIEF DESCRIPTION OF THE DRAWINGS

The invention will be described according to the appended drawings in which.

DETAILED DESCRIPTION OF THE INVENTION

Figure 1A:
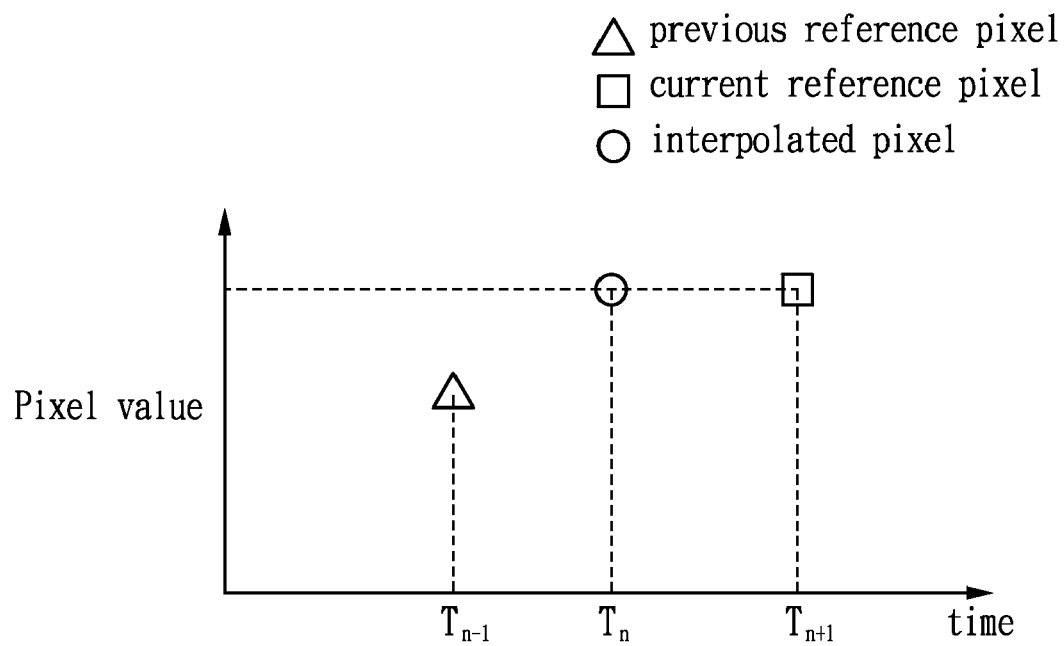
FIG. 1(a) shows the value of a pixel in an interpolated frame determined by a conventional frame repetition method.
Figure 1B:
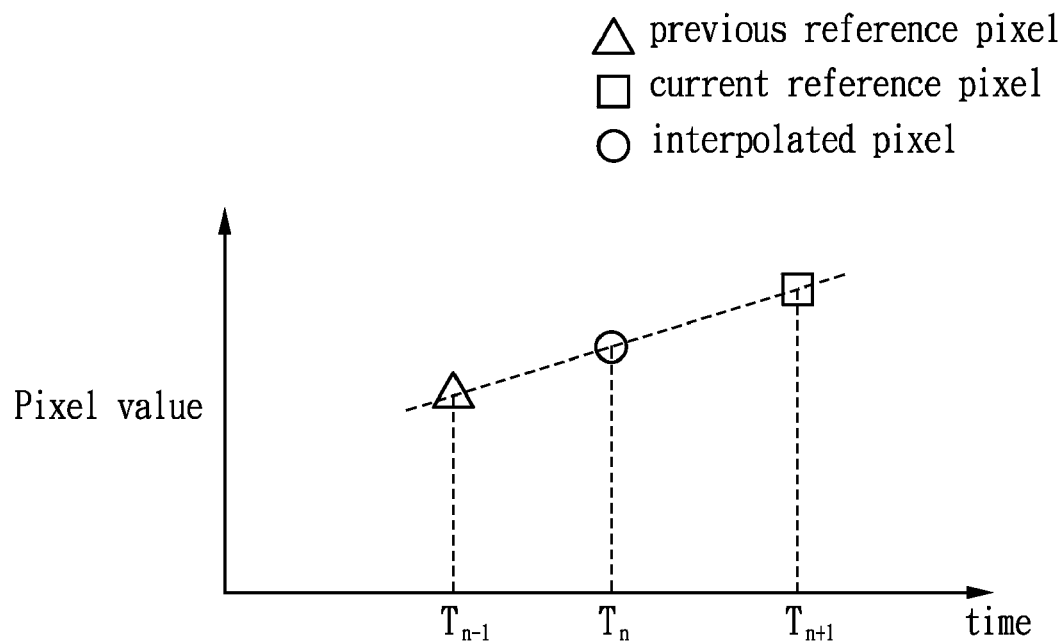
FIG. 1(b) shows the value of a pixel in an interpolated frame determined by a conventional frame averaging method.
Figure 2:
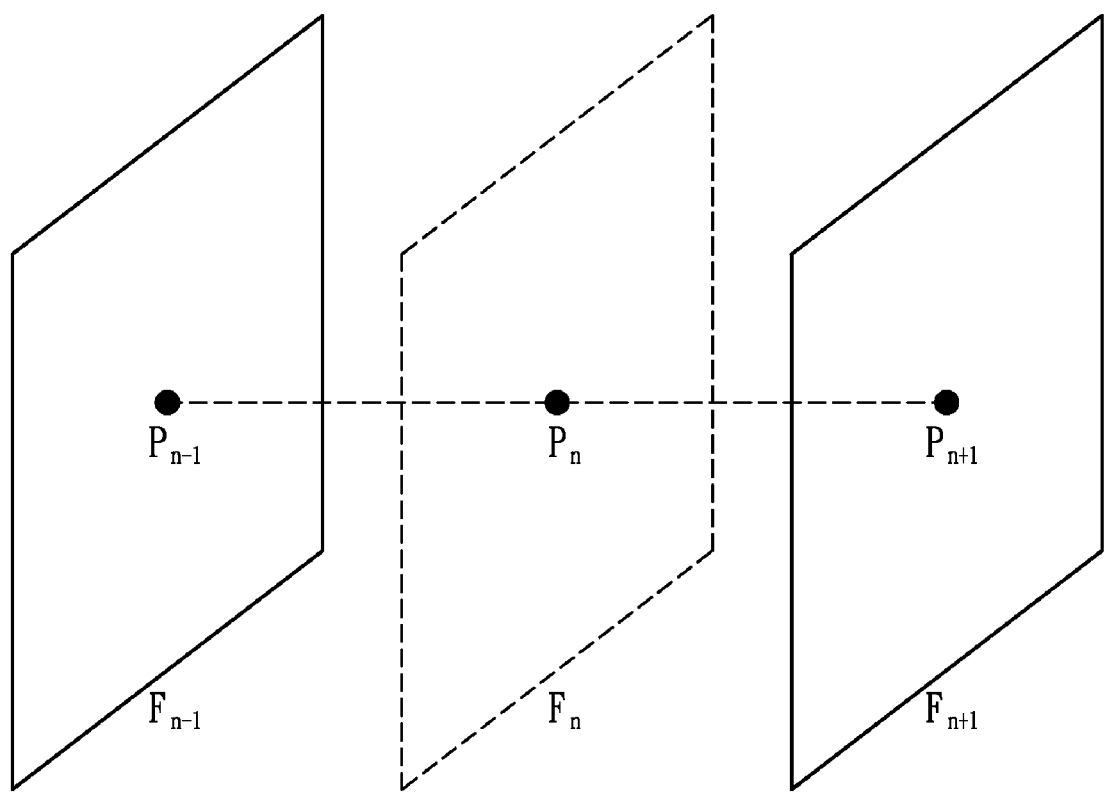
FIG. 2 is a diagram illustrating an interpolated frame inserted between two successive frames in accordance with the present invention.

FIG. 2 is a diagram illustrating an interpolated frame inserted between two successive frames in accordance with the present invention. Frames $F_{n-1}$ and $F_{n+1}$ are frames that precede (t−1) and follow (t+1), respectively, a frame $F_n$ that requires interpolation. A reference pixel $P_{n-1}$ in the previous frame $F_{n-1}$ closely matches a reference pixel $P_{n+1}$ in the current frame $F_{n+1}$, and a pixel $P_n$ in the interpolated frame $F_a$ is an interpolated pixel based on the pixel $P_{n-1}$ and pixel $P_{n+1}$. That is, value $L_n$ of the pixel $P_n$ (where $L_n$ describes one of pixel characteristics such as luminance and chrominance) is determined by the value $L_{n-1}$ of the pixel $P_{n-1}$ and the value $L_{n+1}$ of the pixel $P_{n+1}$ as follows:

$$L_n = L_{n+1} + (L_{n+1} - L_{n-1}) \times r$$

where r is positive weight for the value $L_n$.

Figure 3A:
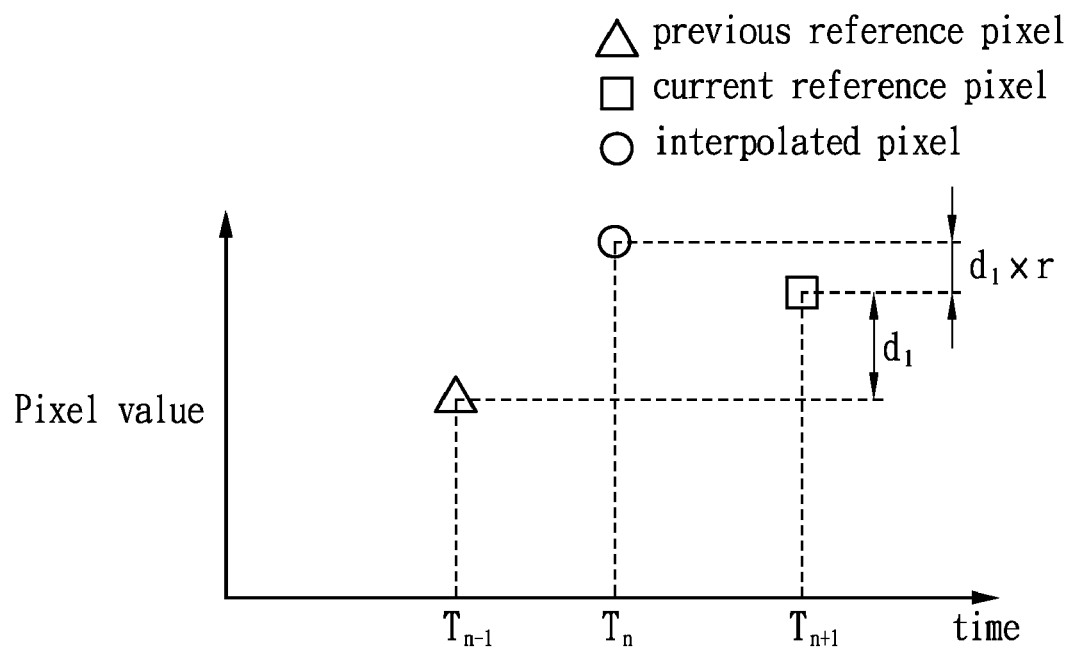
FIG. 3(a) shows the determination of the value of a pixel in an interpolated frame in accordance with the present invention.

Accordingly, when the value $L_{n+1}$ is larger than the value $L_{n-1}$ the value $L_n$ of the pixel $P_n$ in the interpolated frame $F_n$ is larger than each of the values $L_{n+1}$ of the current reference pixel $P_{n+1}$ and the value $L_{n-1}$ of the previous reference pixel $P_{n-1}$. Under such conditions, FIG. 3(a) shows the determination of the value of a pixel in an interpolated frame in accordance with the present invention. The difference d, between the value $L_{n+1}$ and the value $L_{n-1}$ is a positive number, so the interpolated value $L_n$ is larger than the value $L_{n+1}$. Therefore, such an interpolation method produces an overshot pixel value to avoid motion blurs and flickers.

Figure 3B:
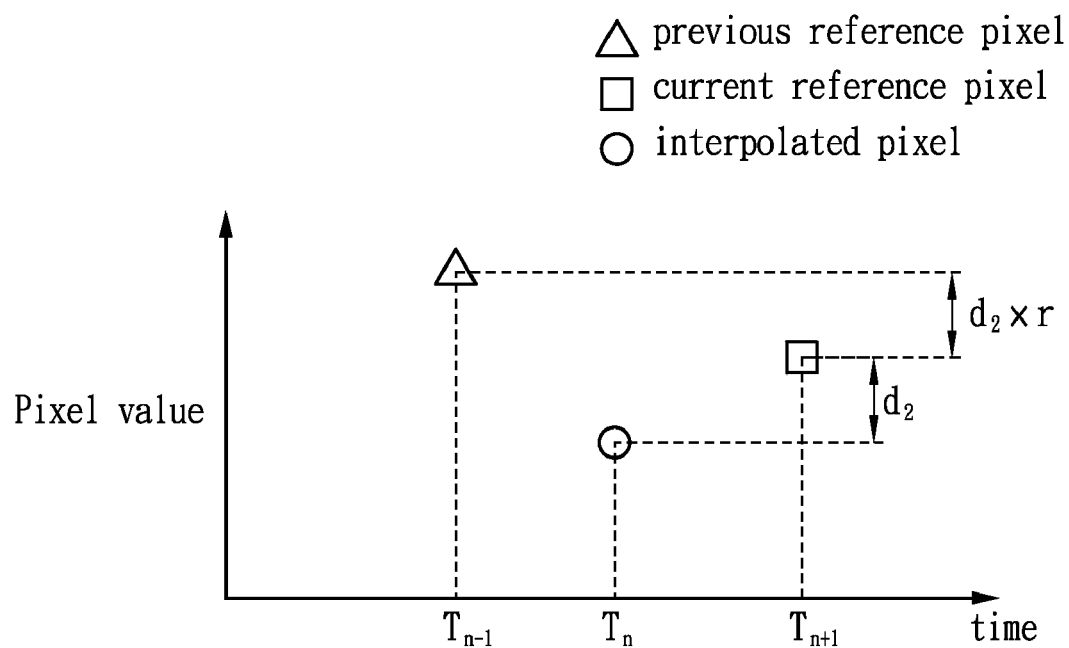
FIG. 3(b) shows the determination of the value of a pixel in an interpolated frame in accordance with the present invention.

By contrast, when the value $L_{n+1}$ is smaller than the value $L_{n-1}$ the value $L_n$ of the pixel $P_n$ in the interpolated frame $F_n$ is smaller than each of the values $L_{n+1}$ of the current reference pixel $P_{n+1}$ and the value $L_{n-1}$ of the previous reference pixel $P_{n-1}$. Under such conditions, FIG. 3(b) shows the determination of the value of a pixel in an interpolated frame in accordance with the present invention. The difference $d_2$ between the value $L_{n+1}$ and the value $L_{n-1}$ is a negative number, so the interpolated value $L_n$ is smaller than the value $L_{n+1}$. Therefore, such an interpolation method produces an undershot pixel value to prevent a video image from motion blurs and flickers.

Figure 4:
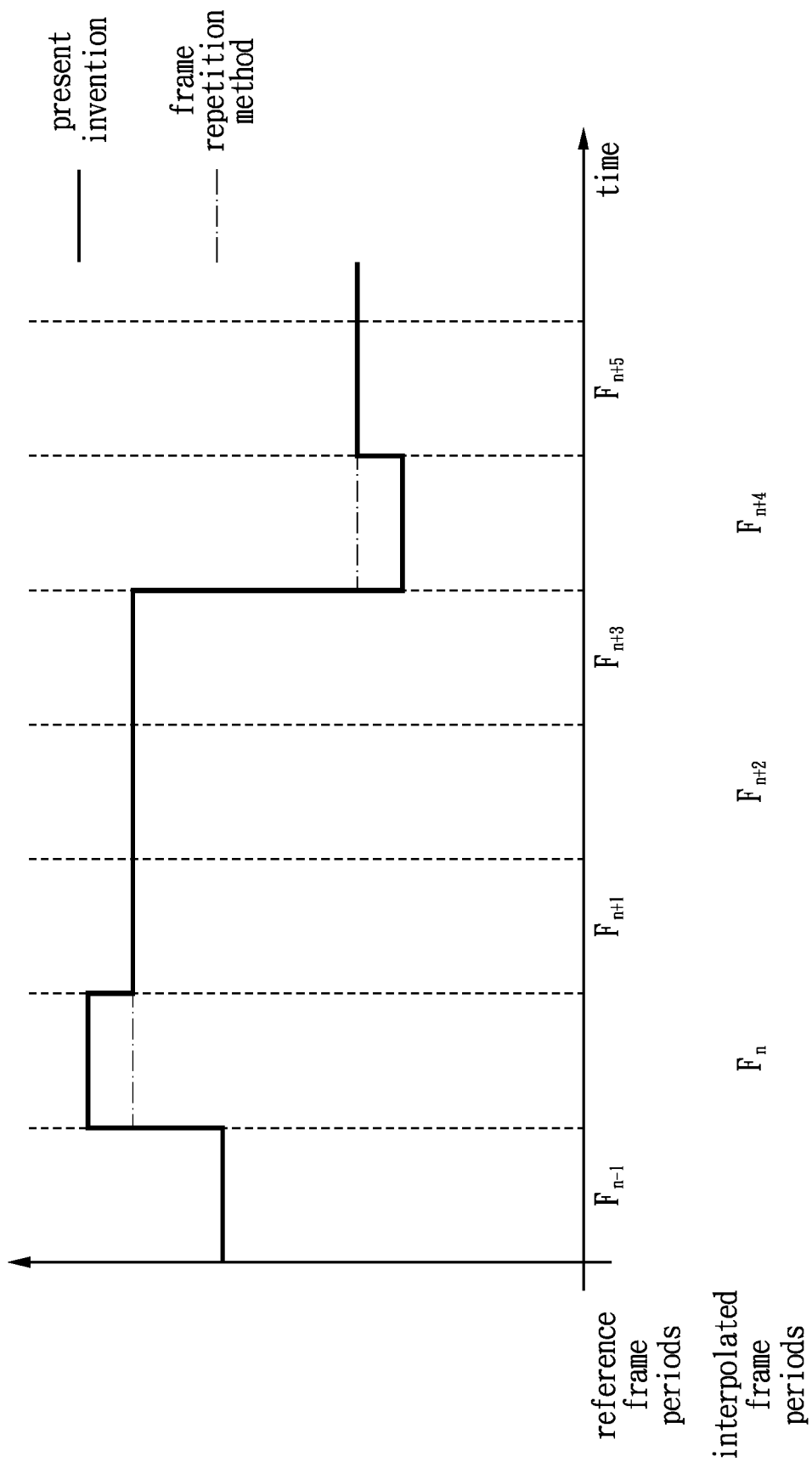
FIG. 4 shows the variation of the values of corresponding pixels in successive frames in accordance with the present invention.

FIG. 4 shows the variation of the values of corresponding pixels in successive frames in accordance with the present invention. Frames $F_{n-1}$, $F_{n+1}$, $F_{n+3}$ and $F_{n+5}$ are reference frames decoded from the video signals, and frames $F_n$, $F_{n+2}$ and $F_{n+4}$ are interpolated using the present interpolation method. In comparison with the conventional frame repetition method, the value of the interpolated pixel in the interpolated frame is overshot or undershot especially during an interpolated frame period between two reference frame periods when a transition of the values of the corresponding reference pixels occur between the adjacent reference frame periods. For example, the value of the interpolated pixel is overshot during the interpolated frame period $F_n$, and is undershot during the interpolated frame period $F_{n+2}$ so that either the overshot value or undershot value causes an over-contrast visual effect.

The above-described embodiments of the present invention are is intended to be illustrative only. Numerous alternative embodiments may be devised by persons skilled in the art without departing from the scope of the following claims.

What is claimed is:

1. A method for doubling the frame rate of video signals having a succession of frames, comprising the steps of:
   receiving a first frame sequentially; and
   inserting a second frame between a third frame and the first frame;
   wherein the first frame is a current frame, the second frame is an interpolated frame and the third frame is a previous frame;
   wherein each pixel in the interpolated frame is valued as a first reference pixel in the current frame biased by a positively weighted difference between the first reference pixel and a second reference pixel in the previous frame.

2. The method for doubling the frame rate of an input video signal of Claim 1, wherein the positively weighted difference is a value of the second reference pixel subtracted from a value of the first reference pixel and multiplied by a positive weight.

3. The method for doubling the frame rate of an input video signal of Claim 1, wherein a value of the pixel in the interpolated frame is either overshot or undershot when a value of the first reference pixel and a value of the second reference pixel differ from each other.

4. The method for doubling the frame rate of an input video signal of Claim 1, wherein a value of the pixel in the interpolated frame is larger than each of values of the first reference pixel and the second reference pixel when the value of the first reference pixel is larger than the value of the second reference pixel.

5. The method for doubling the frame rate of an input video signal of Claim 1, wherein a value of the pixel in the interpolated frame is smaller than each of values of the first reference pixel and the second reference pixel when the value of the first reference pixel is smaller than the value of the second reference pixel.

6. The method for doubling the frame rate of an input video signal of Claim 1, wherein a value of the pixel in the interpolated frame represents luminance or chrominance.

* * * * *